United States Patent
Eichberger

(10) Patent No.: US 10,949,418 B2
(45) Date of Patent: Mar. 16, 2021

(54) METHOD AND SYSTEM FOR RETRIEVAL OF DATA

(71) Applicant: SAP SE, Walldorf (DE)

(72) Inventor: Gert Eichberger, Walldorf (DE)

(73) Assignee: SAP SE, Walldorf (DE)

( * ) Notice: Subject to any disclaimer, the term of this patent is extended or adjusted under 35 U.S.C. 154(b) by 923 days.

(21) Appl. No.: 15/343,240

(22) Filed: Nov. 4, 2016

(65) Prior Publication Data

US 2018/0129703 A1    May 10, 2018

(51) Int. Cl.
| | |
|---|---|
| *G06F 17/00* | (2019.01) |
| *G06F 16/242* | (2019.01) |
| *G06F 16/22* | (2019.01) |
| *G06F 16/25* | (2019.01) |
| *G06F 16/245* | (2019.01) |

(52) U.S. Cl.
CPC ............ *G06F 16/242* (2019.01); *G06F 16/22* (2019.01); *G06F 16/245* (2019.01); *G06F 16/252* (2019.01)

(58) Field of Classification Search
CPC ................................................. G06F 17/30389
See application file for complete search history.

(56) References Cited

U.S. PATENT DOCUMENTS

| | | | |
|---|---|---|---|
| 2004/0199500 A1 | 10/2004 | Masuda et al. | |
| 2006/0143307 A1* | 6/2006 | Codignotto | G06F 3/1276 709/246 |
| 2013/0262598 A1* | 10/2013 | Makanawala | H04L 51/32 709/206 |

FOREIGN PATENT DOCUMENTS

| | | |
|---|---|---|
| JP | 2005-352655 A | 12/2005 |
| JP | 2011-048532 A | 3/2011 |

OTHER PUBLICATIONS

Office Action for corresponding European Application No. 16197304.5 dated Apr. 30, 2018.

(Continued)

*Primary Examiner* — Anhtai V Tran
(74) *Attorney, Agent, or Firm* — Harness, Dickey & Pierce, P.L.C.

(57) ABSTRACT

A computer system, a computer-implemented method, and a computer readable medium having stored thereon a computer executable program code for retrieving data from the database system are disclosed herein. The method comprises: processing by the E-Mail application an E-Mail being either received or sent by the E-Mail application, the E-Mail comprising a template and a content embedded in the template; transmitting by the E-Mail application the content to the database system; storing in the database system the transmitted content assigned to said E-Mail; extracting by the keyword extraction component from the stored content a list of keywords; storing in the database system the list of keywords assigned to said E-Mail; receiving via a user interface of the E-Mail application a signal indicating that a user has selected one of the E-Mails being received or sent by the E-Mail application; sending by the E-Mail application to the database system a request for retrieving data related to the selected E-Mail; retrieving from the database system the list of keywords assigned to the selected E-Mail; selecting a set of keywords each being comprised in the retrieved list of keywords; retrieving from the database system the data related to the set of the keywords; and sending by the database system to the E-Mail application the retrieved data.

18 Claims, 6 Drawing Sheets

(56) References Cited

OTHER PUBLICATIONS

Search Report for corresponding European Application No. 16197304.5 dated Mar. 14, 2017.

* cited by examiner

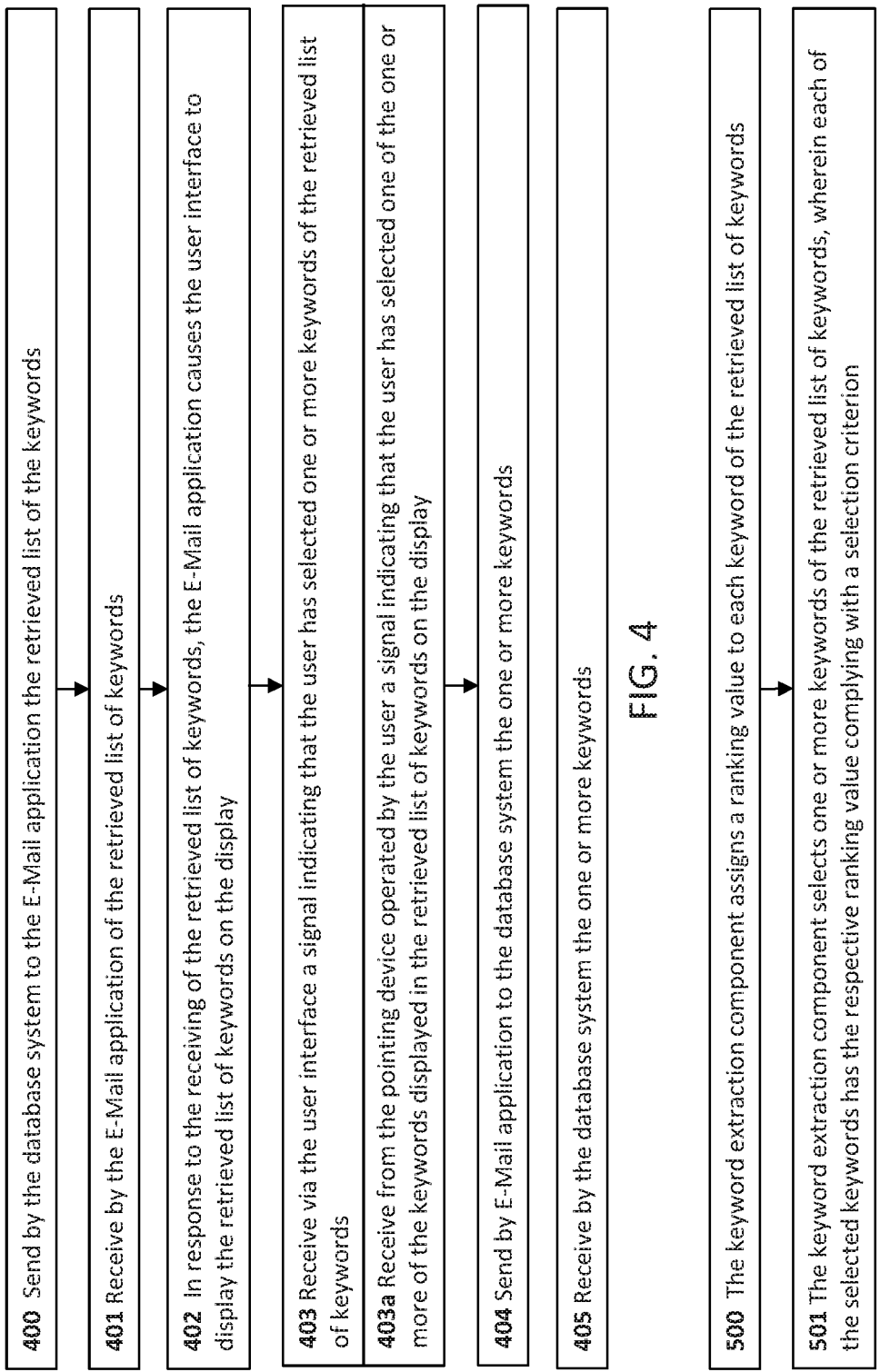

METHOD AND SYSTEM FOR RETRIEVAL OF DATA

TECHNICAL FIELD

This invention relates to computer databases. In particular, this invention relates to an effective management of data in the computer databases storing communication data, e.g. E-Mails.

BACKGROUND

Effective management of data in computer databases is an everlasting problem of computer science. Most of the computer databases are configured to perform the retrieval of data. This problem is well understood when electronic files in a databases have a defined structure (e.g. tabular structure) and linked by foreign key relationships with each other. In this case a query for data retrieval can have a specification of one or more particular fields in the electronic file containing data which has to be retrieved. When execution of the query does result in retrieval of data which complies with specifications, further queries can be formulated to retrieve data in the other electronic files having fields linked by foreign key relationships with the one or more particular fields addressed in the first query. This iterative process can be repeated until the required data is retrieved or until the all possible electronic files are processed. When the foreign key relationships are absent or not sufficient for effective execution of queries, then the foreign key relationships linking different fields of the electronic documents can be generated. In any case, well defined structure of electronic documents is often a premise for structuring data in databases and effective data retrieval from the electronic documents. However this requirement is not always implementable, because the structure of electronic documents can be insufficient for the generation of the foreign key relationships. For instance, the database can store communication data, in particular communication data generated by humans, like E-Mails. In this case only simple structuring of data is available, like grouping of E-Mails in groups, wherein each of the groups corresponds to a particular exchange of E-Mails between two or more users related to a particular topic. In addition, simple searches for E-Mails comprising a word or a combination of words are available for users. These searches can have additional constraints related to time intervals, presence or absence of an attached document, etc. As a result, these functionalities are just a small fraction of functionalities which can be offered by modern databases for processing of structured electronic files having foreign key relationships.

SUMMARY

Part of speech, as understood here, is a category of words (or, more generally, of lexical items) which have similar grammatical properties. Words that are assigned to the same part of speech generally display similar behavior in terms of syntax, They play similar roles within the grammatical structure of sentences and sometimes in terms of morphology, in that they undergo inflection for similar properties. Commonly listed English parts of speech are noun, verb, adjective, adverb, pronoun, preposition, conjunction, interjection, and sometimes numeral, article or determiner.

Stem of a word (or a word stem), as understood here, is a part of the word being common to all its inflected variants. The stem can be a root word being a common stem that gives related words comprising this stem their basic meanings. For instance, a stem of a verb wait is wait: it is the part that is common to all its inflected variants, such as wait (infinitive), wait (imperative), waits (present, 3rd person, singular), wait (present, other persons and/or plural), waited (simple past), waited (past participle), waiting (progressive).

The disclosure generally describes a computer-implemented method for retrieving data from a database, a computer-readable media storing computer executable instructions for executing the computer-implemented method, and a computer system for retrieving data from the databases. The aforementioned inventive solutions can be used for retrieving data from the database storing heterogeneous unstructured data. The data stored in the database can be data generated in a course of information exchange between different instances, e.g. E-Mail exchange between different E-Mail clients. In this case E-Mails can have different formats. Some of them can comprise attachments. The inventive solutions are based on approach which does not require any structuring of data and generation of foreign key relationships.

It is an objective of embodiments of the invention to provide for a computer system configured to provide effective retrieval of data from a data storage storing unstructured data, a computer-implemented method for performing same, and a computer readable medium having stored thereon a computer executable program code for executing the computer-implemented method.

According to one embodiment, the present invention relates to a computer system comprising a database system, a processing unit, a memory, a keyword extraction component, and an E-Mail application for sending and receiving of E-Mails. The memory stores instructions of a computer executable code which execution by the processing unit causes the computer system to perform the following: processing by the E-Mail application an E-Mail being either received or sent by the E-Mail application, the E-Mail comprising a template and a content embedded in the template; transmitting by the E-Mail application the content to the database system; storing in the database system the transmitted content assigned to said E-Mail; extracting by the keyword extraction component from the stored content a list of keywords; storing in the database system the list of keywords assigned to said E-Mail; receiving via a user interface of the E-Mail application a signal indicating that a user has selected one of the E-Mails being received or sent by the E-Mail application; sending by the E-Mail application to the database system a request for retrieving data related to the selected E-Mail; retrieving from the database system the list of keywords assigned to the selected E-Mail; selecting a set of keywords each being comprised in the retrieved list; retrieving from the database system the data related to the set of the keywords; and sending by the database system to the E-Mail application the retrieved data.

According to another embodiment, the present invention relates to a computer-implemented method for retrieving data from a database system. The method is implemented by a computer system comprising the database system, a keyword extraction component, and an E-Mail application for sending and receiving of E-Mails. The method comprises the following steps: processing by the E-Mail application an E-Mail being either received or sent by the E-Mail application, the E-Mail comprising a template and a content embedded in the template; transmitting by the E-Mail application the content to the database system; storing in the database system the transmitted content assigned to said E-Mail; extracting by the keyword extraction component from the stored content a list of keywords; storing in the database system the list of keywords assigned to said E-Mail; receiving via a user interface of the E-Mail application a signal indicating that a user has selected one of the E-Mails being received or sent by the E-Mail application; sending by the E-Mail application to the database system a request for retrieving data related to the selected E-Mail; retrieving from the database system the list of keywords assigned to the selected E-Mail; selecting a set of keywords each being comprised in the retrieved list of keywords; retrieving from the database system the data related to the set of the keywords; and sending by the database system to the E-Mail application the retrieved data.

According to another embodiment, the present invention relates to a computer readable medium having stored thereon a computer executable code for execution by a computer processor controlling a computer system, wherein execution of the instructions of the executable code causes the computer processor to execute the computer-implemented method of the aforementioned embodiment.

These embodiments can be advantageous because they can enable an effective automated accumulation of relevant data in the database system and an effective retrieval of data from database system. The E-Mail application can transmit to the database system automatically only contents of E-Mails without their templates. As a result thereof a storage capacity of the database system is used in an effective way, because storing of templates requires additional storage space and the templates of E-Mails contain as usual only standard data which may be irrelevant for data retrieval from the database system, Storing contents of E-Mails in the database system can have a clear advantage for execution of the E-Mail application, because the E-Mail applications are executed as usual on computers (e.g. smartphones) which have quite limited storage capacity. As a result retrieving of data from on the computer executing the E-Mail application can be problematic, because its storage capacity can be insufficient for storing all E-Mails including their attachments processed by the E-Mail application. Moreover the database system can receive and store contents of E-Mails processed by different E-Mail applications. This feature can make retrieval of data more efficient, because a user of one of the E-Mail application does not have to ask another user of another E-Mail application whether his E-Mail application stores any relevant data. The E-Mails or their contents including possible attached files (e.g. documents) can be stored in the database system without executing structuring of data as it is customary for the general purpose database systems configured to store data in a tabular form having data items in various tables linked by foreign key relationships. This issue is addressed in a different way in the aforementioned embodiments. A list of keywords is extracted from each of the contents received by the database systems. A request from an E-Mail application to retrieve data related to an E-Mail selected by the E-Mail application is executed by the database system in two stages. In the first stage a list of keywords assigned to the selected E-Mail is retrieved from the database system. In the second stage data related to the retrieved list of keywords is retrieved from the database system. The data retrieved in the second stage is returned to the E-Mail application. The request of the E-Mail application can be addressed in a more complex way, i.e. the first and the second stages can be repeated iteratively, wherein in the first stage of any next iteration a new list keywords is extracted from the data retrieved in the second stage of the iteration executed immediately before the any next iteration and the new list of keywords in used for data retrieval in the second stage of the any next iteration. In this case data send to the E-Mail application comprises data retrieved in several second stages. This feature can be advantageous for determining (semantic) relations between different E-Mails, which can be E-Mails processed by different E-Mail applications.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 shows a flowchart of an example method.
FIG. 5 shows a flowchart of an example method.

DETAILED DESCRIPTION

Figure 1:
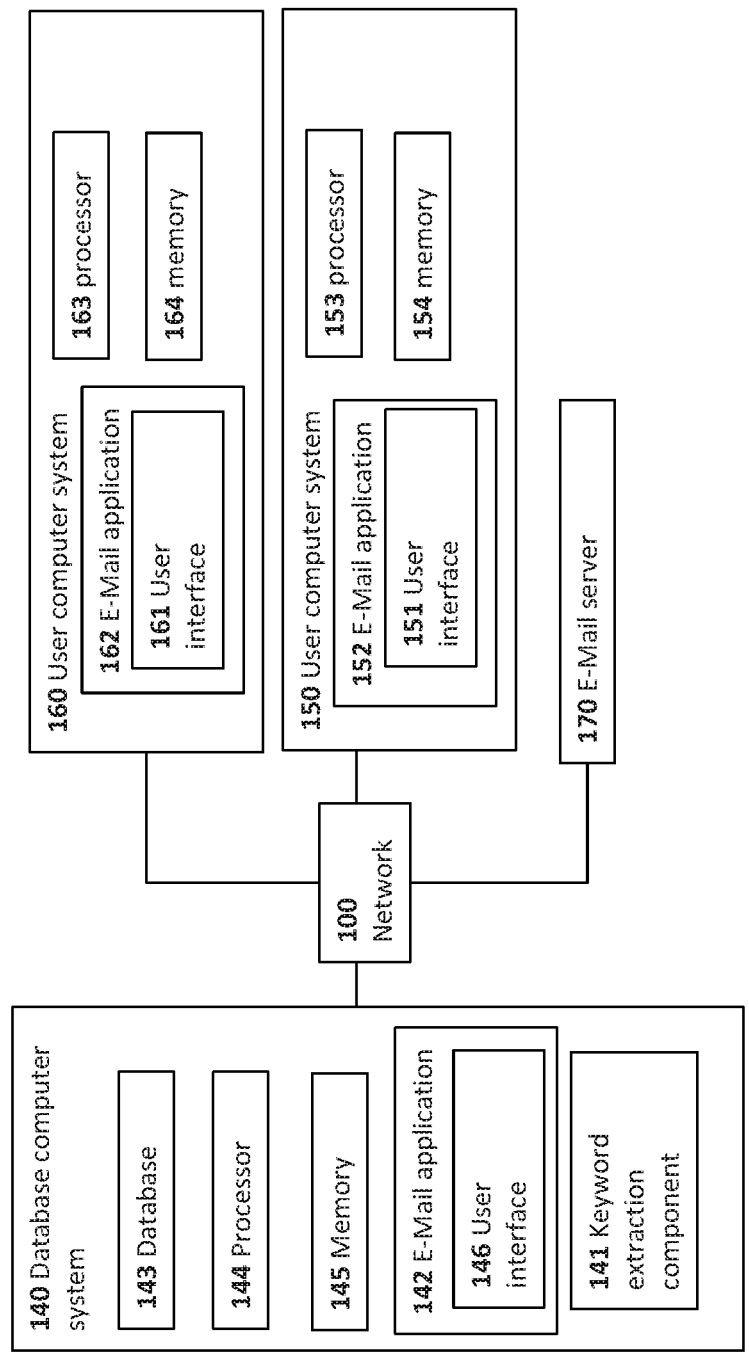
FIG. 1 is a block diagram illustrating an example environment for retrieval of data.

This disclosure generally describes computer-implemented methods, computer-readable media, and control systems for generation of data and retrieval of data. The data can be generated by processing of E-Mails sent or received by one or more E-Mail applications. The E-Mail can comprise fields, e.g. a sender, a recipient, a subject, and a body. A sender filed of an E-Mail comprises an identification of a sender of the E-Mail, e.g. his E-Mail address and/or his name. The sender of an E-Mail can be a user or an application. A recipient field of E-Mail comprises an identification of a recipient of E-Mail, e.g. his E-Mail address and/or his name. A subject filed of an E-Mail comprises a brief description of a subject matter of the E-Mail. A body filed of an E-Mail comprises a message of the E-Mail, e.g. text message of the E-Mail. The body filed can further comprise one or more graphical elements e.g. a picture, a pictogram, an icon, etc. The body field can further comprise a signature of a sender who has sent the E-Mail. An E-Mail can have a template and a content embedded/comprised therein. The content can comprise any of the aforementioned fields of the E-Mail. In case when an E-Mail has one or more attached files (e.g. documents), the content of the E-Mail can further comprise one or more of the attached files.

The generation of data can be extracting lists of keywords from E-Mails or their contents and storing (e.g. in a database computer system) the lists of keywords of the E-Mails assigned to the E-Mails or their contents. The retrieval of data can be a retrieval of data related to and/or comprised in one or more E-Mails (or their contents). The retrieval of data can be executed in an iterative way, wherein data retrieved in a previous iteration is used for retrieval of data in the next iteration. The following description is presented to enable any person skilled in the art to practice the disclosed subject matter, and is provided in the context of one or more particular implementations, Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

According to another embodiment, the selecting of the set of key words each being comprised in the retrieved list of keywords comprises: sending by the database system to the E-Mail application the retrieved list of keywords; receiving via the user interface a signal indicating that the user has selected one or more keywords of the retrieved list of keywords; and sending by E-Mail application to the database system the one or more keywords, wherein the set of the keywords comprises of the one or more keywords.

This embodiment can be advantageous, because it can provide for an extra functionality enabling refinement/detailing of data to be retrieved from the database system.

According to another embodiment, the receiving via the user interface of the application of the signal indicating that the user has selected the one of the E-Mails being received or sent by the E-Mail application comprises: the user interface displaying on a display a symbol representing one of the E-Mails being received or sent by the E-Mail application; and receiving from a pointing device operated by the user a signal indicating that a pointer of the pointing device is positioned by the user in an area of the display corresponding to a selection of the symbol, wherein the E-Mail represented by the symbol is the selected E-Mail.

This embodiment can be advantageous, because it can provide for an effective user interface.

According to another embodiment, the selecting of the set of key words each being comprised in the retrieved list of keywords comprises: receiving by the E-Mail application the retrieved list of keywords; and in response to the receiving by the E-Mail application of the retrieved list of keywords the user interface displaying on the display the retrieved list of keywords.

This embodiment can be advantageous, because it can provide for an effective user interface.

According to another embodiment, the receiving via the user interface of the signal indicating that the user has selected the one or more keywords of the retrieved list of keywords comprises the following being executed for each of one or more keywords of the retrieved list of keywords: receiving from the pointing device operated by the user a signal indicating that the user has selected the each of the one or more of the keywords displayed in the retrieved list of keywords on the display.

This embodiment can be advantageous, because it can provide for an extra functionality enabling refinement/detailing of data to be retrieved from the database system.

According to another embodiment, the keyword extraction component is configured to assign rankings values to keywords, wherein the selecting of the set of key words each being comprised in the retrieved list of keywords comprises: the keyword extraction component assigning a ranking value to each keyword of the retrieved list of keywords; and the keyword extraction component selecting one or more keywords of the retrieved list of keywords, wherein each of the selected keywords has the respective ranking value complying with a selection criterion, wherein the set of the keywords comprises the one or more keywords.

This embodiment can be advantageous, because it can provide for computer parsable algorithm of keyword selection.

According to another embodiment, the respective ranking value assigned to the each keyword is equal to a number of repetitions of the each keyword in the stored content multiplied by a weight coefficient of the each keyword, wherein the weight coefficient is determined by a part of speech to which the each keyword corresponds to and/or by a stem to which the each keyword corresponds.

This embodiment can be advantageous, because it can provide for computer parsable effective algorithm of calculation of ranking values.

According to another embodiment, the stored content comprises content stored in fields of said E-Mail, the fields of said E-Mail comprise the following fields: a sender, a recipient, a subject, and a body, wherein the weight coefficient of the each keyword is further determined by the field in which the each keyword is comprised.

This embodiment can be advantageous, because it can provide for an effective approach for calculating the weight coefficient.

According to another embodiment, the keyword extraction component is configured extract keywords from contents by using a machine learning algorithm and to assign ranking values to keywords by using another machine learning algorithm, the method comprising: registering results of execution of user queries on the database system, wherein each of the user queries comprises a request to retrieve text passages comprising a keyword specified in the each of the queries from contents of E-Mails stored in the database system; generating training data comprising the keywords and their respective text passages registered in the step of the registering results of execution of the user queries on the database system; training the machine learning algorithm using the training data; registering user selections of keywords in list of keywords; generating another training data comprising the user selected keywords and their respective lists of keywords registered in the registering of the user selections of the keywords in the lists of keywords; and training the another machine learning algorithm using the another training data. The selecting of the set of key words each being comprised in the retrieved list of keywords comprises: the keyword extraction component assigning a ranking value to each keyword of the retrieved list of keywords; and the keyword extraction component selecting one or more keywords of the retrieved list of keywords, wherein each of the selected keywords has the respective ranking value complying with a selection criterion, wherein the set of the keywords comprises the one or more keywords.

This embodiment can be advantageous, because it can provide for an effective approach for generating training data for machine learning algorithms.

According to another embodiment, the database system stores contents of other E-Mails processed by the E-Mail application and lists of keywords, wherein each of the other E-Mails is assigned to a respective content of the each of the other E-Mails and a list of keywords of the respective content.

This embodiment can be advantageous, because it can provide for application of the method of retrieving of data comprised in different E-Mails.

According to another embodiment, the computer-implemented method, comprises: extracting by the keyword extraction component from the retrieved data another list of keywords; selecting another set of keywords each being comprised in the another list of the keywords; retrieving from the database another data related to the another set of the keywords; and sending by the database system to the E-Mail application the another data.

This embodiment can be advantageous, because it can provide for an iterative retrieval of data, wherein the data retrieved in the current iteration is used for the retrieval of data in the next iteration.

According to another embodiment, the database system stores lists of keywords and contents of other E-Mails processed one or more other E-Mail applications, wherein each of the other E-Mails is assigned to a respective content of the each of the other E-Mails and a list of keywords of the respective content.

This embodiment can be advantageous, because it can provide for application of the method of retrieving of data comprised in different E-Mails processed by different E-Mail applications (users).

According to another embodiment, the database system stores lists of keywords and contents of other E-Mails processed by said E-Mail application, wherein each of the other E-Mails is assigned to a respective content of the each of the other E-Mails and a list of keywords of the respective content, wherein each of the E-Mails stored in the database system has a respective E-Mail identification of the each of the E-Mails, wherein the retrieving from the database system of the data related to the set of the keywords comprises: identifying in the database system lists of keywords, wherein each of the identified lists of keywords comprises one or more keywords of the set of the keywords; and identifying in the database system, for each of the identified lists of keywords, an E-Mail to which the each of the identified lists of keywords is assigned, wherein the retrieved data comprises E-Mail identifications of the identified E-Mails.

This embodiment can be advantageous because it can provide for an effective retrieval related E-Mails.

According to another embodiment, the database system stores lists of keywords and contents of other E-Mails processed by said E-Mail application, wherein each of the other E-Mails is assigned to a respective content of the each of the other E-Mails and a list of keywords of the respective content, wherein each of the contents comprises a respective sender identification of a sender who has sent an E-Mail to which the each of the contents is assigned, wherein the retrieving from the database system of the data related to the set of the keywords comprises: identifying in the database system lists of keywords, wherein each of the identified lists of keywords comprises one or more keywords of the set of the keywords; identifying in the database system, for each of the identified lists of keywords, an E-Mail to which the each of the identified lists of keywords is assigned; identifying in the database system, for each of the identified E-Mails, a content assigned to the each of the identified E-Mails; and retrieving from each of the identified contents a respective sender identification, wherein the retrieved data comprises the retrieved sender identifications.

This embodiment can be advantageous, because it can provide for an effective identification of senders who's E-Mails are related to the selected E-Mail.

According to another embodiment, the database system stores lists of keywords and contents of other E-Mails processed by said E-Mail application, wherein each of the other E-Mails is assigned to a respective content of the each of the other E-Mails and a list of keywords of the respective content, wherein the retrieving from the database system of the data related to the set of the keywords comprises: retrieving from the database system lists of keywords, wherein each of the retrieved lists of keywords comprises one or more keywords of the set of keywords, wherein the retrieved data comprises the retrieved lists of keywords.

This embodiment can be advantageous, because it can provide for an effective identification of lists of keywords related to the list of keywords of the selected E-Mail.

According to another embodiment, the database system stores lists of keywords and contents of other E-Mails processed by said E-Mail application, wherein each of the other E-Mails is assigned to a respective content of the each of the other E-Mails and a list of keywords of the respective content, wherein the retrieving from the database system of the data related to the set of the keywords comprises: retrieving from the content assigned to the selected E-Mail text passages, wherein each of the text passages comprises one or more keywords of the set of keywords, wherein the retrieved data comprises retrieved text passages are comprised in the retrieved data.

This embodiment can be advantageous, because it can provide for an effective retrieval of the text passages comprising keywords of the selected E-Mail.

According to another embodiment, the each of the contents further comprises a respective sender identification of a sender who has sent an E-Mail to which the each of the contents is assigned, wherein the retrieving from the database system of the data related to the set of the keywords comprises: identifying in the database system, for each of the identified E-Mails, a content being assigned to the each of the identified E-Mails; extracting by the keyword extraction component a further list of keywords from the identified contents; selecting a further set of keywords each being comprised in the further list of keywords; identifying in the database further lists of keywords, wherein each of the further lists of keywords comprises a one or more keywords of the further set of keywords; and executing at least one of the following steps: retrieving from the database the further lists of keywords; identifying in the database system, for each of the further lists of keywords, a further E-Mail to which the each of the further lists of keywords is assigned; identifying in the database system, for each of the further E-Mails, a further content being assigned to the each of the further identified E-Mails; retrieving from each of the further contents a respective sender identification; and retrieving from the further contexts text passages, wherein each of the retrieved text passages comprises one or more keywords of the further set of keywords, wherein the retrieved data comprises the following: the further lists of keywords when the retrieving from the database of the further lists of keywords is executed, E-Mail identifications of the further E-Mails, when the identifying in the database system, for the each of the further identified lists of keywords, of the further E-Mail to which the each of the further lists of keywords is assigned is executed, the retrieved sender identifications, when the retrieving from the each of the further contents of the respective sender identification is executed; the text passages, when the retrieving from the further contexts of the text passages is executed.

This embodiment can be advantageous, because it can provide for an iterative retrieval of heterogeneous data from the database system. In an iteration executed before iteration described this embodiment the E-Mails are identified, whereas in the iteration described in this embodiment any data related to the identified. E-Mails can be retrieved from the database system. The retrieved data can comprise at least one of the following: identifications of E-Mails, lists of keywords, text passages, sender identifications.

According to another embodiment, each of the E-Mails stored in the database system has a respective E-Mail identification of the each of the E-Mails, wherein the retrieving from the database system of the data related to the set of the keywords comprises: extracting by the keyword extraction component a further list of keywords from the identified contents; selecting a further set of keywords each being comprised in the further list of keywords; identifying in the database further lists of keywords, wherein each of the further lists of keywords comprises one or more keywords of the further set of keywords; and executing at least one of the following steps: retrieving from the database the further lists of keywords; identifying in the database system, for each of the further lists of keywords, a further E-Mail to which the each of the further lists of keywords is assigned; identifying in the database system, for each of the further E-Mails, a further content being assigned to the each of the further E-Mails; retrieving from each of the further contents a respective sender identification; and retrieving from the further contexts text passages, wherein each of the retrieved text passages comprises one or more keywords of the further set of keywords, wherein the retrieved data comprises the following: the further lists of keywords when the retrieving from the database of the further lists of keywords is executed, E-Mail identifications of the further E-Mails, when the identifying in the database system, for the each of the further identified lists of keywords, of the further E-Mail to which the each of the further lists of keywords is assigned is executed, the sender identifications retrieved in the set of the retrieving from the each of the further contents of the respective sender identification when said step is executed, and the text passages, when the retrieving from the further contexts of the text passages is executed.

This embodiment can be advantageous, because it can provide for an iterative retrieval of heterogeneous data from the database system. In an iteration executed before iteration described this embodiment the senders of E-Mails are identified, whereas in the iteration described in this embodiment any data related to the identified senders can be retrieved from the database system. The retrieved data can comprise at least one of the following: identifications of E-Mails, lists of keywords, text passages, sender identifications.

According to another embodiment, each of the E-Mails stored in the database system has a respective E-Mail identification of the each of the E-Mails, wherein each of the other E-Mails is assigned to a respective content of the each of the other E-Mails and a list of keywords of the respective content, wherein the retrieving from the database system of the data related to the set of the keywords comprises: identifying in the database system, for each of the retrieved lists of keywords, an E-Mail to which the each of the retrieved lists of keywords is assigned, wherein E-Mail identifications of the identified E-Mails are comprised in the retrieved data; identifying in the database system, for each of the identified E-Mails, a content being assigned to the each of the identified E-Mails; extracting by the keyword extraction component a further list of keywords from the identified contents; selecting a further set of keywords each being comprised in the further list of keywords; identifying in the database further lists of keywords, wherein each of the further lists of keywords comprises one or more keywords of the further set of keywords; and executing at least one of the following steps: retrieving from the database the further lists of keywords; identifying in the database system, for each of the further lists of keywords, a further E-Mail to which the each of the further lists of keywords is assigned; identifying in the database system, for each of the further E-Mails, a further content being assigned to the each of the further E-Mails; retrieving from each of the further contents a respective sender identification; retrieving from the further contexts text passages, wherein each of the retrieved text passages comprises one or more keywords of the further set of keywords, wherein the retrieved data comprises the following: the further lists of keywords, when the retrieving from the database of the further lists of keywords is executed, E-Mail identifications of the further E-Mails, when the identifying in the database system, for the each of the further identified lists of keywords, of the further E-Mail to which the each of the further lists of keywords is assigned is executed, the sender identifications, when the retrieving from the each of the further contents of the respective sender identification is executed, the text passages, when the retrieving from the further contexts of the one or more text passages is executed.

This embodiment can be advantageous, because it can provide for an iterative retrieval of heterogeneous data from the database system. In an iteration executed before iteration described this embodiment the lists of keywords are retrieved, whereas in the iteration described in this embodiment any data related to the retrieved lists of keywords can be retrieved from the database system. The retrieved data can comprise at least one of the following: identifications of E-Mails, lists of keywords, text passages, sender identifications.

According to another embodiment, each of the other E-Mails is assigned to a respective content of the each of the other E-Mails and a list of keywords of the respective content, wherein the each of the contents further comprises a respective sender identification of a sender who has sent an E-Mail to which the each of the contents is assigned, wherein the retrieving from the database system of the data related to the set of the keywords comprises: identifying in the database system lists of keywords, wherein each of the identified lists of keywords comprises one or more keywords of the set of the keywords; identifying in the database system, for each of the identified lists of keywords, an E-Mail to which the each of the retrieved lists of keywords is assigned; identifying in the database system, for each of the identified E-Mails, a content being assigned to the each of the identified E-Mails; extracting by the keyword extraction component a further list of keywords from the identified contents; selecting a further set of keywords each being comprised in the further list of keywords; identifying in the database further lists of keywords, wherein each of the further lists of keywords comprises one or more keywords of the further set of keywords; and executing at least one of the following steps: retrieving from the database the further lists of keywords; identifying in the database system, for each of the further lists of keywords, a further E-Mail to which the each of the further lists of keywords is assigned; identifying in the database system, for each of the further E-Mail s, a further content being assigned to the each of the further E-Mails; retrieving from each of the further contents a respective sender identification; retrieving from the further contexts another text passages, wherein each of the another text passages comprises one or more keywords of the further set of keywords, wherein the retrieved data comprises the following: the further lists of keywords, when the retrieving from the database of the further lists of keywords is executed, E-Mail identifications of the further E-Mails, when the identifying in the database system, for the each of the further identified lists of keywords, of the further to which the each of the further lists of keywords is assigned is executed, the sender identifications, when the retrieving from the each of the further contents of the respective sender identification is executed; the another text passages, when the retrieving from the further contexts of the another text passages is executed.

This embodiment can be advantageous, because it can provide for an iterative retrieval of heterogeneous data from the database system. In an iteration executed before iteration described this embodiment the text passages are retrieved, whereas in the iteration described in this embodiment any data related to the retrieved text passages can be retrieved from the database system. The retrieved data can comprise at least one of the following: identifications of E-Mails, lists of keywords, text passages, sender identifications.

FIG. 1 illustrates an example environment for processing of E-Mails and extracting information being related to or comprised in them. The example environment comprises a database system 140. The database system comprises at least one of the following components: a database 143, a processor 144, a memory 145, a keyword extraction component 141, an E-Mail application. The memory 145 can store a computer executable code, which when executed by the processor 144 causes the processor 144 to execute any of the computer-implemented methods mentioned herein. The executable code can comprise an executable code of the E-Mail application 142, when the E-Mail application 142 is executed on the database system 140. In this case the execution of the executable code by the processor 144 causes execution of the E-Mail application code by the processor. The database system can be configured to communicate with one or more E-Mail applications 142, 160, 150. The communication can comprise receiving E-Mails sent or received by the E-Mail application from the E-Mail application, and/or receiving contents of E-Mails sent or received by the E-Mail application, and/or receiving one or more keywords from the E-Mail application, sending to the E-Mail application data related to one or more keywords. The E-Mails and/or their contents, keywords of the E-Mails and/or their contents are stored in the database system 140, e.g. in the database 143 in the database system 140. Each of the E-Mails or its content stored in the database system 140 is assigned to the each of the E-Mails and the list of its keywords. This can be implemented by generating a table, wherein each row comprises identification of the E-Mail, identification of a file storing the E-Mail or its content, identification of a list of keywords of the E-Mail. Thus by querying the table by identification of an E-Mail it is possible to identify the file storing the E-Mail or its content and a list of its keywords. An E-Mail or its content stored in the database system can further comprise an identification of a sender who has sent the E-Mail. In order to facilitate execution of queries in the database, the sender identification can be comprised in the respective row of the aforementioned table. The database system is configured to retrieve data related to one or more keywords from data stored in the database system. The E-Mails and/or their contents can be stored in the database system 140 in a predetermined format, e.g. plain text format. Using a specific format for storing data can facilitate data retrieval.

The example environment can further comprise one or more of the following components: the computer system 160 or 150 on which the respective E-Mail application 162 or 152 is executed, a computer network 100, and an E-Mail server. The network 100 is configured to provide communicative coupling between the database system 140 and at least one of the aforementioned components. The network 100 can comprise one or more wired networks (e.g. Ethernet) and/or on or more wireless networks (e.g. digital cellular telecommunication network). The E-Mail applications 142, 160, 150 can exchange E-Mails via the E-Mail server 170. In addition or instead of the receiving of the E-Mails and/or their contents from the E-Mail applications, the database system 140 can receive the E-Mails and/or their contents from the E-Mail server 170.

The computer system 160 (150) can comprise a processor 163 (153), a memory 163 (153), and an E-Mail application 162 (152). The computer system 150, 160 can be a general purpose computer system, a handheld mobile device, a tablet, a smart phone, laptop, a PC, a desktop, etc. The memory 163 (153) can store a computer executable code, which when executed by the processor 164 (154) causes the processor 164 (154) to execute any of the methods mentioned herein. The memory 164 (154) can store further a computer executable code of the E-Mail application 162 (152). In this case the execution of the computer executable code of the E-Mail application 160 (150) by the processor 164 (154) causes execution by the processor 160 (150) of the E-Mail application 162 (152). The memory 164 (154) can further store E-Mails processed by the E-Mail application 162 (161). The processing of E-Mails by the E-Mail application comprises at least one of the following operations: sending of an E-Mail, receiving of an-Mail, extracting of a content embedded in a template of an E-Mail. Besides processing of E-Mails the E-Mail application can request lists of keywords assigned to E-Mails from the database system, request data related to keywords from the database system, forward processed E-Mails and/or their contents to the database system 140. The database system can store E-Mails and/or their contents processed by one or more E-Mail applications. The E-Mail application can further process user queries. The user query can comprise a keyword specified by a user. In return the E-Mail application presents to the user one or more text passages comprised in E-Mails, wherein each of the presented text passages comprises the keyword specified in the user query.

The keyword extraction component 141 is configured to extract keywords from data comprising at least one of the following: one or more E-Mails, one or more contexts of E-Mails, one or more phrases comprised in an E-Mail or its content, one or more text passages comprised in an E-Mail or its content. The text passage can be a fragment of a text of an E-Mail having a predetermined number of words. The keyword extraction component can be further configured to assign a ranking value to an extracted keyword. Extraction of keywords can be implemented as follows. The keyword extraction component calculates a number of repetitions for each of words comprised in data. Afterwards is calculates a ranking value for each of the words being equal to the number of its repetitions multiplied by its weight factor. The weight factor can be determined by a part of speech to which the key word belongs. For instance articles of the English language (e.g. "a" and "the") can have weight coefficients equal to zero, while nouns can have nonzero rankings being higher than adverbs having nonzero rankings as well. In addition or as an alternative the weight coefficients of words can be specified in a dictionary, wherein each of words has an assigned respective weight coefficient. In this case the weight coefficient of a particular keyword is the weight coefficient of the word in the dictionary being the same as the particular keyword. Alternatively or in addition, the weight coefficients of stems of words can be specified in a dictionary, wherein each of stems has an assigned respective weight coefficient. In this case the weight coefficient of a particular keyword (e.g. wait, waits, waited, waiting) is the weight coefficient of a stem (e.g. wait) in the dictionary corresponding to the particular keyword. The stem can be a root word being the common stem that gives related words comprising this stem their basic meanings. As another alternative or additional factor determining a weight coefficient of a particular keyword can be placement of the particular word in the field of E-Mail, e.g. body, sender, recipient, and subject. For instance, a keyword placed in a subject filed of an E-Mail can have a higher weight coefficient in comparison with a case when the same keyword is placed in a body filed of an E-Mail.

Extraction of keywords as assigning ranking values to them can be performed using a machine learning algorithm, e.g. decision tree learning, association tree learning, artificial neural networks, inductive logic programming, etc. The process of keyword extraction and the ranking assignment process can be implemented using different machine learning algorithms. Training data for the keyword extraction algorithm can be collected by monitoring user queries and registering their results. The user query specifies a keyword specified by a user of an E-Mail application. The result of the user query is one or more text passages comprising the specified keyword. The text passage selected by a user who has sent the user query is registered as a result of the query. Afterwards the keyword and the registered text passage are appended to the training data. The training data can build using queries of a single user or a group of users. The training data can be collected using the user queries executed via an E-Mail application. The queries can be executed by querying data (e.g. E-Mails or their contents) stored in the E-Mail application (e.g. 150 or 160) and/or in the database system 140. After collection of the training data the keyword extraction algorithm is trained and set for utilization in the keyword extraction component.

Training data for the ranking assignment algorithm can be collected by monitoring user selections of keywords out of lists of keywords presented to them. An E-Mail application can present a list of keywords assigned to an E-Mail in response to a user request. Afterwards the E-Mail application registers one or more keywords selected by the user from the list presented to him. The list of keywords and the one or more selected keywords are appended to the training data. The training data can be collected using data collected from one user or a group of users. After collection of the training data the ranking assignment algorithm is trained and set for utilization in the keyword extraction component.

Figure 2:
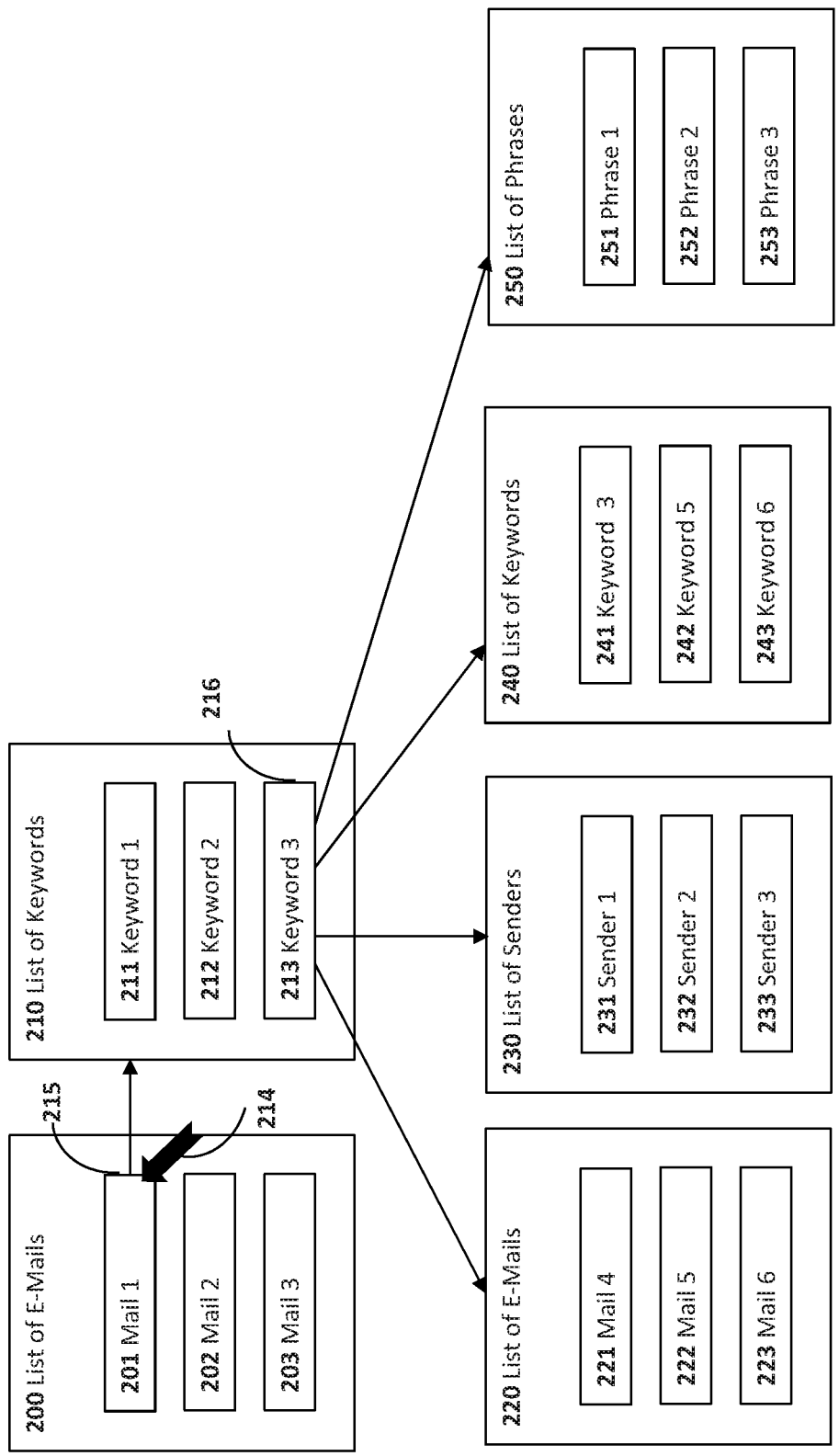
FIG. 2 shows an example user interface.

FIG. 2 illustrates an example user interface 146, 151, 161 of the E-Mail application 142, 152, 162. The user interface can be executed using a pointing device like touchpad, joystick, or a touchpad and a display, which can have a touchscreen functionality. These devices are comprised in the computer system 160, 150 or a database system 140 on which the E-Mail application is executed. The E-Mail application is operable for causing the user interface to display on the display various lists, e.g. list of E-Mails 200, 220 comprising E-Mail identifications 201-203, 221-223; list of keywords 210, 220 comprising keywords 211-213, 241-243; list of senders 230 comprising identifications of senders 231-223; list of phrases or text passages 250 comprising phrases or text passages 251-253. The E-Mail application is further operable for receiving via the user interface a signal from a user indicating that he has selected one of the items in one of the lists. The signal can be received via the touch screen functionality of the display and/or via the pointing device. FIG. 2 depicts an example, wherein a pointer 214 of a mouse or a joystick points to "Mail 1" 201 in the list of E-Mail 200. Each of the items in the list can have a respective area on the display being used for selection of the each of the items. The item is selected when the pointer of the pointing device is within the respective area of the item. In the aforementioned example, the "Mail 1" is selected on FIG. 2 because the pointer 214 is within the area 215 of the "Mail 1". The selection of a particular item in the list can require not only positioning on the display of the pointer within the selection area of the particular item but a receiving of a confirmation signal from a user. The confirmation signal can be received via a button of a touchpad or a mouse. The confirmation signal is generated in response to pressing by a user of the button.

Figure 3:
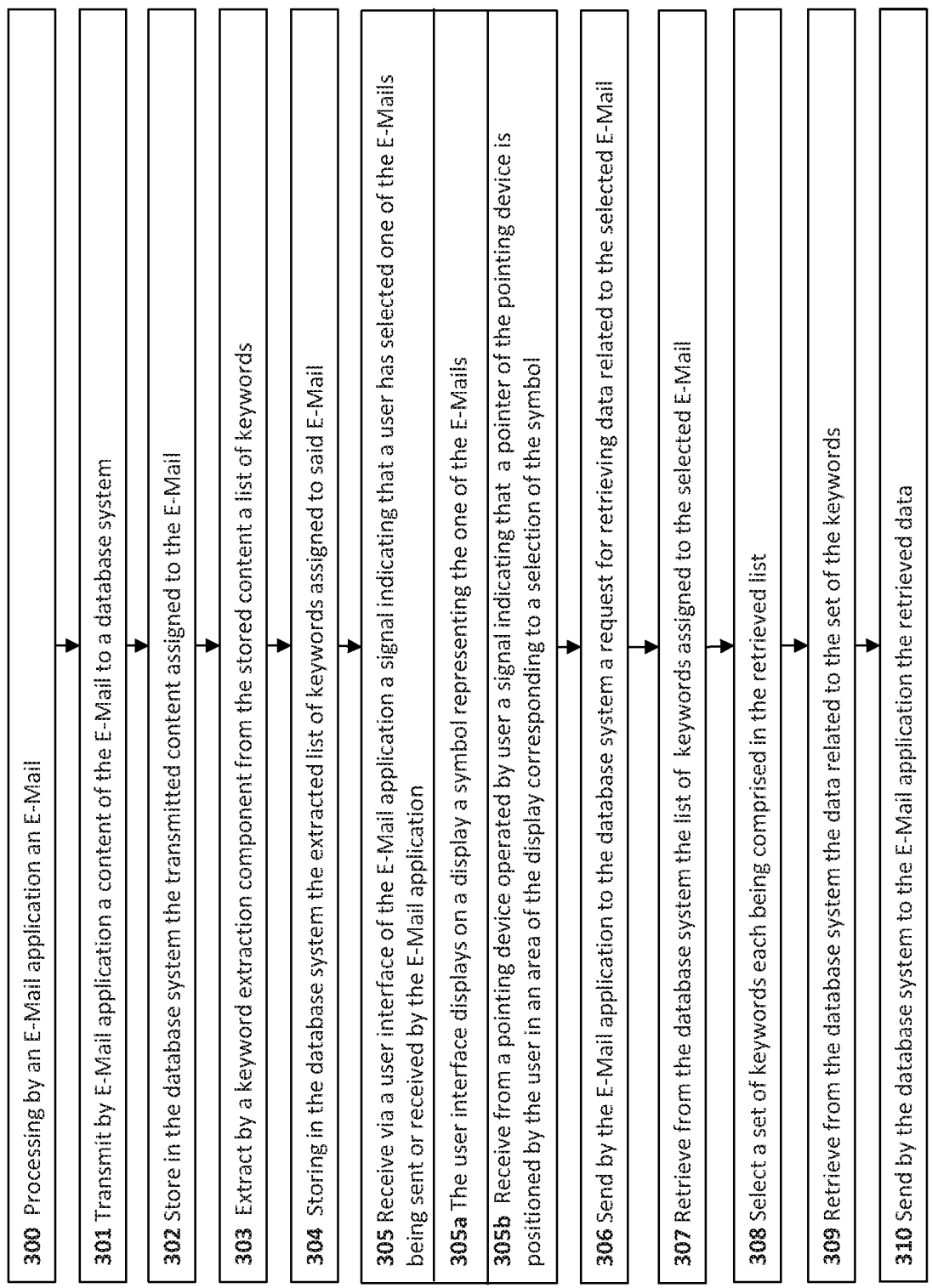
FIG. 3 shows a flowchart of an example method.

FIG. 3 depicts a flowchart depicts a computer-implemented method which can be executed using the example environment depicted on FIG. 1. The method begins with process block 300, in process block 300 the E-Mail application processes an E-Mail being either received or sent by the E-Mail application. The E-Mail can comprise a template and a content embedded in the template. Process block 301 is executed after process block 300. In process block 301 the E-Mail application transmits the content of the E-Mail or the E-Mail to the database system. This can be executed via the network 100. Process block 302 is executed after process block 301. In process block 302 the transmitted E-Mail or its transmitted content are stored in the database system. Process block 303 is executed after process block 302. In process block 303 the keyword extraction component extracts from the stored E-Mail or from its stored content a list of keywords. Process block 304 the database system stores the extracted list of keywords assigned to the E-Mail processed in process block 300. Process block 305 is executed after process block 304. In process block 304 a signal is received via a user interface (e.g. 161) of the E-Mail application (e.g. 162). The signal indicates that a user has selected one of the E-Mails being received or sent by the E-Mail application. The signal can be received as described above.

Process block 305 can comprise process blocks 305a and 305b. In process block 305a the user interface displays on a display a symbol representing one of the E-Mails being received or sent by the E-Mail application. Process block 305b is executed after process block 305a. In process block 305b a signal is received from a pointing device operated by the user. The signal indicates that a pointer of the pointing device (e. g. 214) is positioned by the user in an area (e.g. 215) of the display corresponding to a selection of the symbol (e.g. symbol 201 of "Mail 1"). As described above this indicates that the one of the E-Mails is selected (e.g. Mail 1), i.e. it is the E-Mail selected in process block 305.

Process block 306 is executed after process block 305. In process block 306 the E-Mail application sends to the database system a request for retrieving data related to the selected E-Mail. Process block 307 is executed after process block 306. In process block 307 the list of keywords assigned to the selected E-Mail is retrieved from the database system. Turning back the aforementioned example, list 210 is retrieved from the database system as the list being assigned to "Mail 1" 201. Process block 308 is executed after process block 307. In process block 308 a set of keywords each being comprised in the retrieved list of keywords is selected. Turning back the aforementioned example, the set of keywords consists of one selected "Keyword 3" 213. Process block 309 is executed after process block 308. In process block 309 the data related to the set of the keywords is retrieved from the database system. Turning back the aforementioned example, the data retrieved from the database system can comprise at least one of the following lists: List of E-Mails 210, List of senders 230, List of keywords, and list of phrases or text passages 250. Process block 310 is executed after process block 309. In process block 310 the database system sends the retrieved data to the E-Mail application.

FIG. 4 depicts a flowchart of a computer-implemented method, which can be used for execution of process block 308. The method begins with process block 400. In process block 400 the database system sends to the E-Mail application the list of keywords, which is retrieved in process block 307. Process block 401 is executed after process block 400. In process block 401 the E-Mail application receives the retrieved list of keywords. Process block 402 is executed after process block 401. In process block 402 the E-Mail application causes user interface to display on the display the received list of keywords in response to the receiving of the retrieved list of keywords. Turning back to the aforementioned example, the E-Mail application displays in the display the list of keywords 210 being assigned to the selected in process block 305 "Mail 1" 201. Process block 403 is executed after process block 402. In process block 403 a signal indicating that the user has selected one or more keywords of the retrieved list of keywords is received via the user interface. This process block can be implemented as described above. The one or more selected keywords can be comprised in the set of keywords generated in process block 308. Alternatively the set of keywords generated in process block 308 can consist of the one or more selected keywords.

Process block 403 can comprise an optional process block 403a. In process block 403a the following is executed for each of one or more keywords of the retrieved list of keywords: receiving from the pointing device operated by the user a signal indicating that the user has selected the each of the one or more of the keywords displayed in the retrieved list of keywords on the display. The selection of the keyword can be implemented in a similar way as selection of the E-Mail in process block 305b. Each of the keywords of the retrieved list is displayed on the display as a respective symbol and has a respective area on the display for selection of the each of the keywords. In process block 403a a signal is received from a pointing device operated by the user. The signal indicates that a pointer of the pointing device (e.g. 214) is positioned by the user in an area (e.g. 216) of the display corresponding to a selection of the symbol (e.g. symbol of "Keyword 3"). As described above this indicates that the one of keywords 211-213 is selected (e.g. "Keyword 3"), i.e. it is the keyword selected in process block 403a. The selection of the keyword can be confirmed by receiving a conformation signal from the user. The confirmation signal can be generated in response to pressing by the user of a button of the pointing device (e.g. a button of touchpad or a mouse).

Process block 404 is executed after process block 403. In process block 404 The E-Mail application sends to the database system the one or more keywords selected in process block 403. Process block 405 is executed after process after process block 404. In process block 405 the database system receives from the E-Mail application the one or more keywords selected in process block 403.

FIG. 5 depicts a flowchart of a computer-implemented method, which can be used for execution of process block 308. In contrast the flowchart of the computer-implemented method depicted on FIG. 4, the set of keywords each being comprised in the list of keywords retrieved in process block 307 is generated automatically, e.g. by the database system without any user assistance. The method depicted on FIG. 5 begins with process block 500. In process block 500 the keyword extraction component assign a ranking value to each of the keywords of the retrieved list of keywords. Process block 501 is executed after process block 500. In process block 501 the keyword extraction component selects one or more keywords of the retrieved list of keywords. Each of the selected keywords has the respective ranking value complying with a selection criterion. The one or more selected keywords can be comprised in the set of keywords generated in process block 308. Alternatively the set of keywords generated in process block 308 can consist of the one or more selected keywords. The selection criterion can be formulated in different ways. For instance, according to a selection criterion only a predetermined number (or percentage) of keywords of the retrieved list is selected, wherein each of the selected keywords has the higher ranking value than any of the keywords of the retrieved list which is not selected. Alternatively, according to another selection criterion only keywords each having a ranking value being bigger than a predetermined threshold value is selected.

Figure 6:
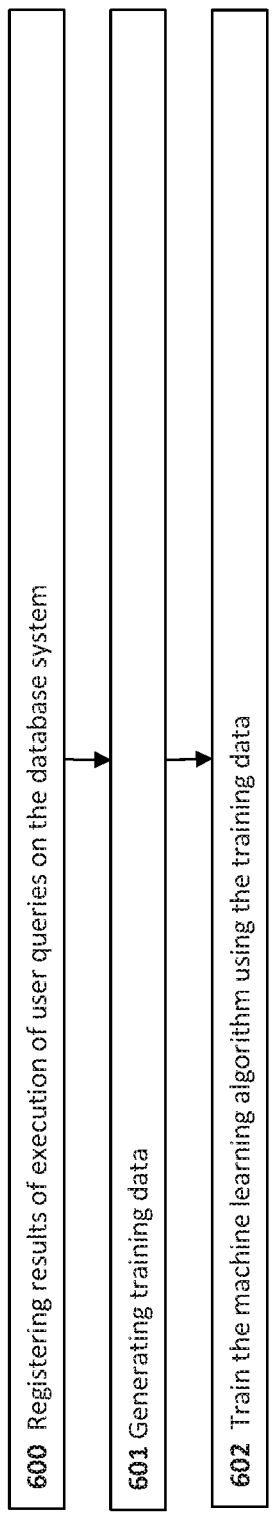
FIG. 6 shows a flowchart of an example method.

FIG. 6 depicts a flowchart of a computer-implemented method, which can be used for optimization of the machine learning algorithms used by the keyword extraction component for extraction of the lists of keywords and assigning ranking values to them as described above. The method depicted on FIG. 6 begins with process block 600. In process block 600 results of execution of user queries on the database system are registered. Each of the user queries comprises a request to retrieve from contents of E-Mails and/or E-Mails stored in the database system text passages and/or phrases each comprising a keyword specified in the each of the queries. Process block 601 is executed after process block 601. In process block 601, training data comprising the keywords and their respective text passages registered in process block 600 is generated. Process block 602 is executed after process block 601. In process block 602 the machine learning algorithm for extraction lists of keywords is trained using the training data generated in process block 601.

Process blocks 600-602 can be used for training of the machine learning algorithm for assigning ranking values to keywords. In this case in process block 600 user selections of keywords in list of keywords are registered. For instance, user selections made in a course of execution of the method depicted on FIG. 4 can be used. In process block 601 the training data is generated. The training data comprises the user selected keywords and their respective lists of keywords registered in process block 601. Each of the list of keywords as an assigned one or more keywords which were selected by the user from the each of the lists of keywords. In process block 602 the machine learning algorithm for assigning ranking values to keywords is trained using the training data generated in process block 601.

When the methods depicted on FIG. 6 are executed the extraction of the list of keywords in process block 303 is executed by the keyword extraction component using the machine learning algorithm for extraction of lists of keywords and the assignment of the ranking value to the each keyword of the retrieved list of keywords in process block 501 is executed by the keyword extraction component using the machine learning algorithm for assigning ranking values to keywords.

Figure 7:
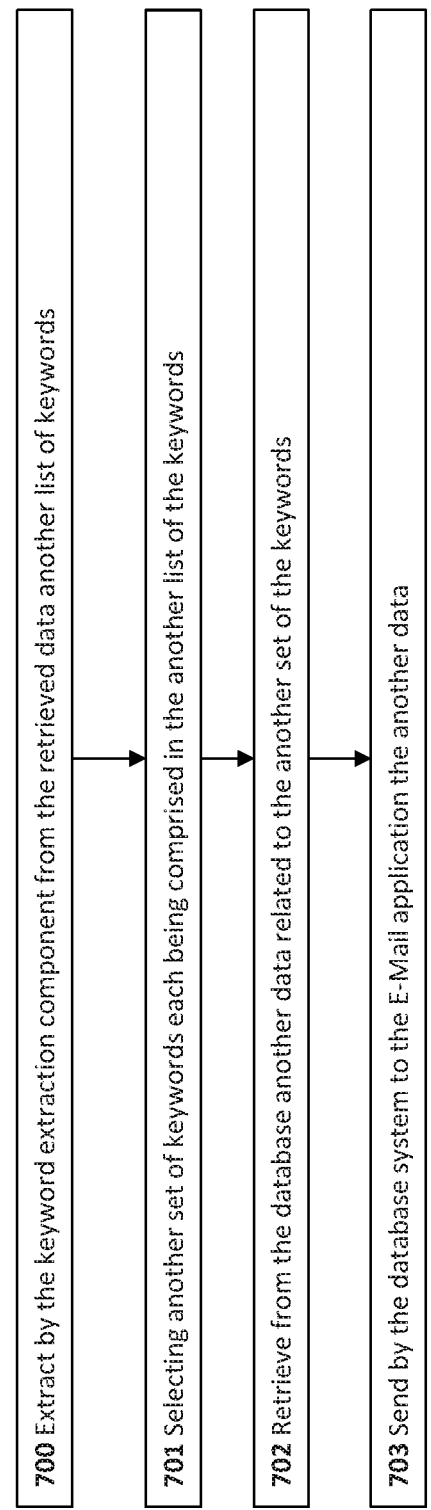
FIG. 7 shows a flowchart of an example method.

FIG. 7 depicts a flowchart of a computer-implemented method, for subsequent retrieval of data from the database system using the data retrieved as a result of execution of the method depicted on FIG. 3. The method depicted on FIG. 7 begins with process block 700. In process block 700 by the keyword extraction component extracts data another list of keywords from the data retrieved in process block 309. Process block 701 is executed after process block 700, In process block 701 another set of keywords each being comprised in the list of the keywords extracted in process block 700 is selected. The selection can be done in the same way as in process block 308. Process block 702 is executed after process block 701, In process block 702 another data related to the set of the keywords selected in process block 701 is retrieved from the database system. The retrieval can be done in the same way as in process block 309. Process block 703 is executed after process block 702. In process block 703 the database system sends the data retrieved in process block 702 to the E-Mail application. The sending can be done in the same way as in process block 310.

Figure 8:
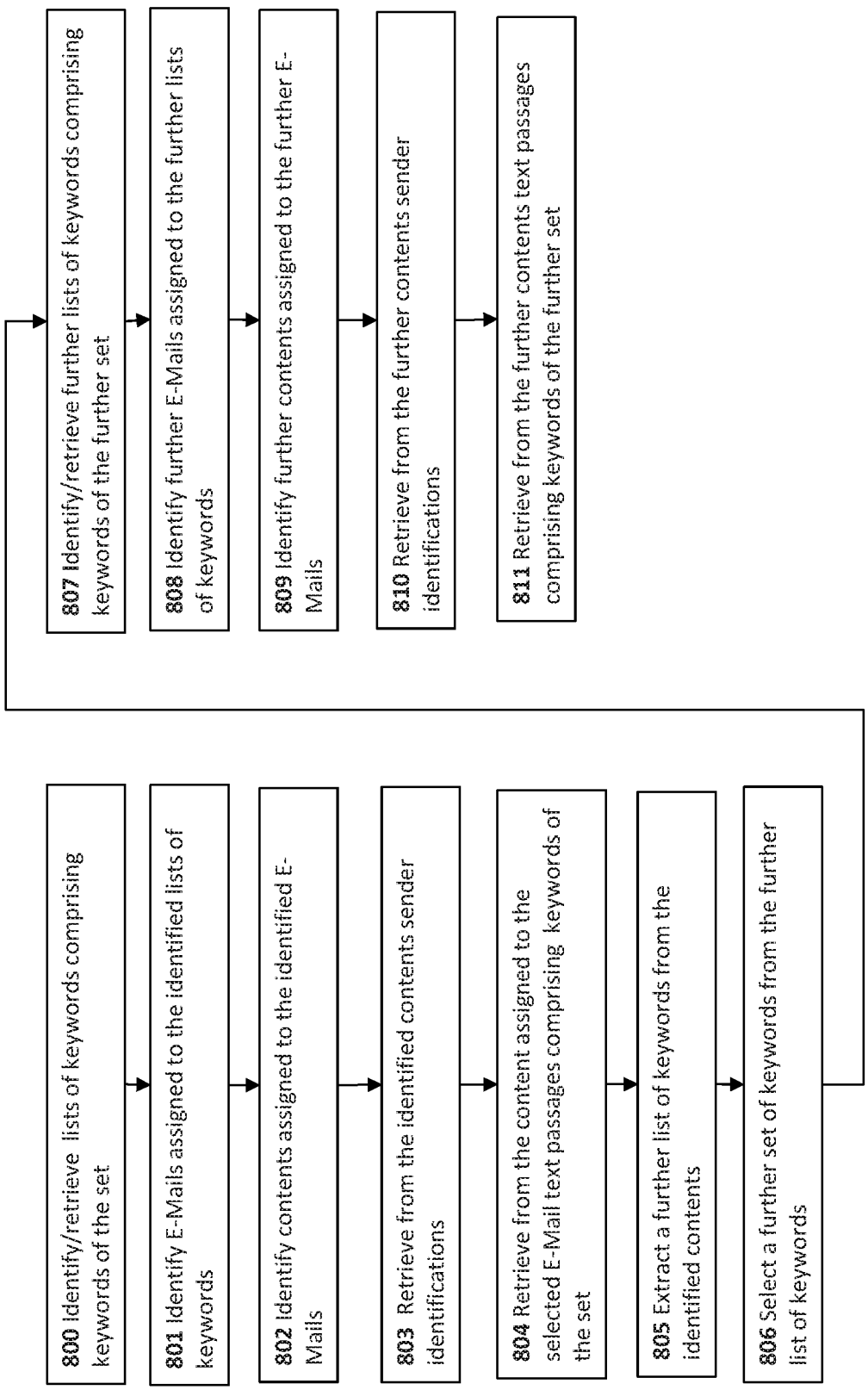
FIG. 8 shows a flowchart of an example method.

FIG. 8 depicts a flowchart of a computer-implemented method. Different combinations of the process blocks of the method depicted on FIG. 8 can be used for execution of process block 309. The method depicted on FIG. 8 begins with process block 800. In process block 800 one or more lists of keywords are identified in or retrieved from the database system. Each of the one or more lists of keywords comprises one or more keywords of the set of keywords selected in in process block 308. Alternatively all lists of keywords are identified in or retrieved from the database system, wherein each of them comprises one or more keywords of the set of keywords selected in in process block 308. Process block 801 is executed after process block 800. In process block 801, for each of the identified or retrieved lists of keywords, an E-Mail to which the each of the identified or retrieved lists of keywords is assigned is identified in the database system. Process block 802 is executed after process block 801. In process block 802, for each of the E-Mails identified in process block 801, a content assigned to the each of the identified E-Mails is identified. Process block 803 is executed after process block 803. In process block 803 a sender identification is retrieved from each of the contents identified in the process block 802. Process block 804 can be executed before or after any of the aforementioned process blocks 800-803. In process block 804 one or more text passages or phrases are retrieved from the content assigned to the E-Mail selected in process block 305, wherein each of the text passages or phrases comprises one or more keywords of the set of keywords selected in process block 308. Alternatively all text passages or phrases are retrieved from the content assigned to the E-Mail selected in process block 305, wherein each of them comprises one or more keywords of the set of keywords selected in process block 308.

Process block 805 is executed after process block 802 or any other process block executed after process block 802. In process block 805 the keyword extraction component extracts a list of keywords from the contents identified in process block 802. The extraction is executed in the same way as in process block 303. Process block 806 is executed after process block 805. In process block 806 a set of keywords is selected from the list of keywords extracted in process block 805. The selection is executed in the same way as in process block 308. Process block 807 is executed after process block 806. In process block 807 one or more lists of keywords are identified in or retrieved from the database system. Each of the one or more lists of keywords comprises one or more keywords of the set of keywords selected in in process block 806. Alternatively all lists of keywords are identified in or retrieved from the database system, wherein each of them comprises one or more keywords of the set of keywords selected in in process block 806. Process block 808 is executed after process block 807. In process block 808, for each list of keywords identified or retrieved in process block 807, an E-Mail to which the each of the identified or retrieved lists of keywords is assigned is identified in the database system. Process block 809 is executed after process block 808. In process block 809, for each of the E-Mails identified in process block 808, a content assigned to the each of the identified E-Mails is identified. Process block 810 is executed after process block 809. In process block 810 a sender identification is retrieved from each of the contents identified in the process block 809. Process block 811 can be executed after process block 809 or process block 810. In process block 811 one or more text passages or phrases are retrieved from the one or more or all of the contents identified in process block 809, wherein each of the text passages or phrases comprises one or more keywords of the set of keywords selected in process block 806.

As it is mentioned above execution of all process blocks depicted in FIG. 8 is not mandatory. The data retrieved in process block 309 can comprise any data item (a list of keywords, an E-Mail identification, a sender identification, a text passage, or a phrase) retrieved in any of the executed process blocks of the method depicted on FIG. 8. For instance, the data retrieved in process block 309 comprises the E-Mail identifications of the E-Mails identified in process block 801 when process blocks 800 and 801 are executed. The data retrieved in process block 309 comprises the sender identifications retrieved in process block 803, when process blocks 800-803 are executed. The data retrieved in process block 309 comprises the lists of keywords retrieved in process block 800, when only process block 800 is executed. The data retrieved in process block 309 comprises the phrases or the text passages retrieved in process block 804, when process block 804 is executed. The data retrieved in process block 309 comprises the lists of keywords retrieved in process block 807, when process blocks 800-802 and 805-807 are executed. The data retrieved in process block 309 comprises the E-Mail identifications of the E-Mails identified in process block 808 when process blocks 800-802 and 805-808 are executed. The data retrieved in process block 309 comprises the sender identifications retrieved in process block 810, when the process blocks 800-802 and 805-810 are executed. The data retrieved in process block 309 comprises the phrases or the text passages retrieved in process block 811, when the process blocks 800-802, 805-809, and 811 are executed.

The preceding figures and accompanying description illustrate the example processes and computer implementable techniques. But the example environment (or their software or other components) contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, the example environment may use processes with additional, fewer and/or different operations, as long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "computer system" and "database system" refer to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

The "user interface" may be a "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer, Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any implementation or on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some causes be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

The invention claimed is:

1. A computer-implemented method for retrieving data from a database system, the computer-implemented method being implemented by a computer system including a display, the computer-implemented method comprising:

processing, by the computer system, an E-Mail being either received or sent by an E-Mail application, the E-Mail including a template and a content embedded in the template;

extracting, by the computer system using a keyword extractor, the content of the E-Mail and;

identifying, by the computer system using the keyword extractor, keywords that are included in the content of the E-Mail;

assigning, by the computer system using the keyword extractor, rankings values to the keywords;

generating, by the computer system, a keyword list of the keywords that are included in the content of the E-Mail, the keyword list based on the keywords and the ranking values of the keywords;

storing the content and the keyword list in the database system assigned to the E-Mail;

receiving, via a user interface of the E-Mail application, a selection by a user of at least one selected E-Mail;

sending, by the computer system to the database system, a request for data related to each selected E-Mail;

retrieving, from the database system, the keyword list assigned to each selected E-Mail;

displaying, on the display, the keyword list for each selected E-Mail;

receiving, via the user interface, a user selection by the user of a keyword set of keywords selected from the keyword list for each selected E-Mail displayed for the user;

retrieving, from the database system, retrieved data that is related to the keyword set; and sending, by the database system to the E-Mail application, the retrieved data.

2. The computer-implemented method of claim 1,
wherein the receiving via the user interface of the E-Mail application of the selection by the user of the at least one selected E-Mail includes,
the user interface displaying on a display a symbol representing each E-Mail being received or sent by the E-Mail application, and
receiving, from a pointing device operated by the user, a positioning of a pointer in an area of the display corresponding to a selection of the symbol, wherein the E-Mail represented by the symbol is the selected E-Mail, and wherein the selecting of the keyword set includes, receiving, by the E-Mail application, the keyword list, displaying the keyword list on the display, and receiving, from the pointing device operated by the user, the user selection of the at least one selected keyword set displayed in the keyword list on the display.

3. The computer-implemented method of claim 1, wherein the keyword extractor is configured to extract keywords from the content by using a machine learning algorithm and to assign ranking values to each keyword by using another machine learning algorithm, wherein the computer-implemented method includes, registering results of execution of user queries on the database system, wherein each user query includes a request to retrieve text passages that include a keyword specified in each user query from the content of the E-Mails stored in the database system, generating training data including the keywords and the text passages, training the machine learning algorithm using the training data, registering user selections of at least one selected keyword in the keyword list that is selected by the user, generating another training data including the at least one selected keyword and the at least one keyword list that includes at least one of the at least one selected keyword, and training the another machine learning algorithm using the another training data, wherein the selecting of the keyword set includes, assigning, by the keyword extractor, a ranking value to each of the at least one selected keywords, and selecting, by the keyword extractor, the at least one selected keyword of the keyword list, wherein the ranking value of each of the at least one selected keyword satisfies a selection criterion, and wherein the keyword set includes the at least one selected keyword.

4. The computer-implemented method of claim 1, further comprising:

extracting, by the keyword extractor, another keyword list selecting another keyword set including the keywords in the another keyword list;

retrieving, from the database system, additional retrieved data related to the another keyword set; and sending, by the database system, to the E-Mail application, the additional retrieved data.

5. The computer-implemented method of claim 1, wherein the database system is further configured to store the keyword lists and the content of at least one other E-Mail processed by one or more other E-Mail applications, and wherein each other E-Mail is assigned to a content and a keyword list of the keywords included in the content.

6. The computer-implemented method of claim 1, wherein the selecting of the keyword set includes, selecting, by the keyword extractor, at least one selected keyword of the keyword list, wherein each selected keyword is assigned the ranking value according to a selection criterion.

7. The computer-implemented method of claim 6, wherein the ranking value assigned to each selected keyword is based at least on a number of repetitions of the selected keyword in the content multiplied by a weight coefficient of the keyword, and wherein the weight coefficient is based at least on a part of speech of the keyword to and/or by a stem of the keyword.

8. The computer-implemented method of claim 7, wherein the content is stored in a field of each E-Mail that is selected from a field set comprising, a sender, a recipient, a subject, and a body, and wherein the weight coefficient of each keyword is further based at least on the field of the keyword.

9. The computer-implemented method of claim 1, wherein the database system is further configured to store the keyword list and the content of each other E-Mail processed by the E-Mail application, wherein each E-Mail stored in the database system includes an E-Mail identification, wherein the retrieving of the retrieved data related includes, identifying, in the database system, at least one identified keyword list, wherein each identified keyword list includes at least one keyword of the keyword set, and identifying, in the database system, for each identified keyword list, at least one identified E-Mail to which the identified keyword list is assigned, and wherein the retrieved data includes the E-Mail identification of each identified E-Mail.

10. The computer-implemented method of claim 9, wherein each content further includes at least one sender identification of a sender of the E-Mail to which the content is assigned, wherein the retrieving the retrieved data includes, identifying, for each identified E-Mail, an identified content that is assigned to the identified E-Mail, extracting, by the keyword extractor, a further keyword list of keywords in the identified content, selecting a further keyword set including at least one of the keywords in the further keyword list, identifying at least one additional further keyword list, wherein each additional further keyword list includes at least one keyword of the further keyword set, and wherein the computer-implemented method includes at least one of, retrieving, from the database system, the keyword list, identifying, in the database system, for each additional further keyword list, at least one further E-Mail to which the additional further keyword list is assigned, identifying, in the database system, for each further E-Mail, a further content being assigned to the further E-Mail, retrieving, from each further content, the at least one sender identification, and/or retrieving, from the further content, at least one text passage, wherein each text passage includes at least one keyword of the additional further keyword set, and wherein the retrieved data includes, the at least one additional further keyword list when the retrieving from the database system of the at least one additional further keyword list is executed, the E-Mail identification of each further E-Mail, when the identifying of the at least one further E-Mail to each additional further keyword list is assigned is executed,
the at least one sender identification, when the retrieving of from the at least one sender identification is executed, and
the at least one text passage, when the retrieving from the at least one text passage is executed.

11. The computer-implemented method of claim 1,
wherein the database system is further configured to store keywords lists and content of each other E-Mail processed by said E-Mail application,
wherein each other E-Mail includes a content and at least one sender identification of a sender who has sent the other E-Mail to which the content is assigned,
wherein the retrieving from the database system of the data related to the keyword set includes,
identifying, in the database system, at least one identified keyword list, wherein each identified keyword list includes at least one keyword of the keyword set,
identifying, in the database system, for each of the identified keyword list, at least one identified E-Mail to which the identified keyword list is assigned,
identifying, in the database system, for each identified E-Mail, an identified content assigned the identified E-Mail, and
retrieving, from each identified content, at least one sender identification, and
wherein the retrieved data includes the at least one sender identification.

12. The computer-implemented method of claim 11,
wherein each E-Mail stored in the database system includes an E-Mail identification,
wherein the retrieving of the retrieved data includes,
extracting, by the keyword extractor, a further keyword list of keywords from identified content of each identified E-Mail,
selecting a further keyword set of keywords that are included in at least one further keyword list,
identifying, in the database system, at least one further keyword list, wherein each further keyword list includes at least one keyword of the further keyword set, and
executing at least one of,
identifying, in the database system, for each further keyword list, a further E-Mail to which the further keyword list is assigned,
identifying, in the database system, for each further E-Mail, a further content being assigned to the further E-Mail,
retrieving, from each further content, at least one respective sender identification, and/or
retrieving, from the further content, at least one text passage, wherein each text passage includes one or more keywords of the further keyword set, and
wherein the retrieved data includes at least one of,
the at least one further keyword list,
the E-Mail identification of each further E-Mail, when the identifying of the at least one further E-Mail is executed,
the at least one sender identification of each further E-Mail when the identifying of the at least one further email is executed, and/or
the at least one text passage, when the retrieving of the at least one text passage is executed.

13. The computer-implemented method of claim 1,
wherein each other E-Mail stored by the database system is assigned to an other content and a content keyword list of the keywords of the other content,
wherein the retrieving from the database system of the data related to the keyword set includes retrieving, from the database system, a further keyword list, wherein each further keyword list includes at least one keyword that is included in the keyword set and the content keyword list of at least one other E-Mail, and
wherein the retrieved data includes the at least one further keyword list.

14. The computer-implemented method of claim 13,
wherein each E-Mail stored in the database system includes an E-Mail identification,
wherein the retrieving from the database system of the retrieved data includes,
identifying, in the database system, for each further keyword list, an identified E-Mail to which the further keyword list is assigned,
identifying, in the database system, for each identified E-Mail, the content being assigned to the identified E-Mail,
extracting, by the keyword extractor, an additional further keyword list from the content of each identified E-Mail,
selecting a further keyword set including at least one keyword that is included in at least one additional further keyword list,
identifying, in the database system, a still further keyword list, wherein each still further keyword list includes at least one of the keywords included in the at least one additional further keyword list, and
executing at least one of,
retrieving, from the database system, the at least one still further keyword list, and/or
identifying, in the database system, for each still further keyword list, a further E-Mail to which the still further keyword list is assigned,
identifying, in the database system, for each further E-Mail, a further content that is assigned to the further E-Mail,
retrieving from each further content at least one further sender identification, and/or
retrieving from the further content at least one further text passage, wherein each further text passage includes at least one keywords of the still further keyword set, and
wherein the retrieved data includes at least one of,
the at least one still further keyword list, when the retrieving from the database system of the at least one still further keyword list is executed,
the E-Mail identification of each further E-Mail, when the identifying in the database system for each still further keyword list, of the further E-Mail to which the still further keyword list is assigned is executed,
the at least one further sender identification, when the retrieving of the at least one further sender identification is executed, and/or
the at least one further text passage, when the retrieving from the database system of the at least one further text passage is executed.

15. The computer-implemented method of claim 1,
wherein the retrieving of the retrieved data includes retrieving, from the content assigned to the selected E-Mail, at least one text passage, wherein each text passage includes at least one of the keyword of the keyword set, and wherein the retrieved data includes the at least one text passage.

16. The computer-implemented method of claim 15, wherein the retrieving from the database system of the retrieved data includes, identifying, in the database system, at least one identified keyword list that includes at least one keyword of the keyword set, identifying, in the database system, for each identified keyword list, an identified E-Mail to the identified keyword list is assigned, identifying, in the database system, for each identified E-Mail, identified content that is assigned to the identified E-Mail, extracting, by the keyword extractor, a further keyword list including at least one keyword that is included in at least one of the identified content, selecting a further keyword set of keywords that are included in the further keyword list, identifying, in the database system, a still further keyword list of keywords that are included in the further keyword set, and executing at least one of, retrieving, from the database system, the still further keyword list, identifying, in the database system, for each further keyword list, a further E-Mail to which the further keyword list is assigned, identifying, in the database system, for each further E-Mail, a further content that is assigned to the further E-Mail, retrieving, from each further content, at least one sender identification, and/or retrieving, from the further content, at least one further text passage, wherein each further text passage includes at least one of the keywords of the further keyword set, and wherein the retrieved data includes at least one of, the still further keyword list, when the retrieving from the database system of the still further keyword list is executed, the E-Mail identification of each further E-Mail, when the identifying in the database system of the further E-Mail to which each further keyword list is assigned is executed, the at least one sender identification, when the retrieving of the each further content of the at least one sender identification is executed, and/or the further text passage, when the retrieving of the further text passage is executed.

17. A non-transitory computer readable medium storing a computer executable code for execution by a computer processor controlling a computer system, wherein execution of the computer executable code causes the computer processor to execute a computer-implemented method for retrieving data from a database system, the method comprising:

processing, by the computer system, an E-Mail being either received or sent by an E-Mail application, the E-Mail including a template and a content embedded in the template;

extracting, by the computer system using a keyword extractor, the content of the E-Mail and;

identifying, by the computer system using the keyword extractor, keywords that are included in the content of the E-Mail;

assigning, by the computer system using the keyword extractor, rankings values to the keywords;

generating, by the computer system, a keyword list of the keywords that are included in the content of the E-Mail, the keyword list based on the keywords and the ranking values of the keywords;

storing the content and the keyword list in the database system assigned to the E-Mail;

receiving, via a user interface of the E-Mail application, a selection by a user of at least one selected E-Mail;

sending, by the computer system to the database system, a request for data related to each selected E-Mail;

retrieving, from the database system, the keyword list assigned to each selected E-Mail;

displaying, on the display, the keyword list for each selected E-Mail;

receiving, via the user interface, a user selection by the user of a keyword set of keywords selected from the keyword list for each selected E-Mail displayed for the user;

retrieving, from the database system, retrieved data that is related to the keyword set; and sending, by the database system to the E-Mail application, the retrieved data.

18. A computer system comprising:

a processing unit;

a display; and a memory storing instructions of a computer executable code which execution by the processing unit causes the computer system to, process, by the computer system, an E-Mail being either received or sent by an E-Mail application, the E-Mail including a template and a content embedded in the template;

transmit, by the computer system, the content to a database system;

store, in the database system, the content;

identify, by the computer system using a keyword extractor, keywords that are included in the content of the E-Mail;

assign, by the computer system using the keyword extractor, rankings values to the keywords;

generate, by the computer system, a keyword list of the keywords that are included in the content of the E-Mail, the keyword list based on the keywords and the ranking values of the keywords;

store, in the database system, the keyword list that is assigned to each E-Mail;

receive, via a user interface of the E-Mail application, a user selection by a user of at least one selected E-Mail;

send, by the computer system to the database system, a request for retrieving data related to the selected E-Mail;

retrieve, from the database system, the keyword list assigned to each selected E-Mail;

display, on the display, the keyword list for each selected E-Mail;

receive, via the user interface, a user selection by the user of a keyword set of keywords selected from the keyword list for each selected E-Mail displayed for the user;

retrieve, from the database system, retrieved data that is related to the keyword set; and send, by the database system to the computer system, the retrieved data.

\* \* \* \* \*